July 17, 1923.

J. P. BROPHY

SIGNAL DEVICE FOR VEHICLES

Filed July 20, 1921

1,462,319

INVENTOR.
John P. Brophy.
BY
Fay, Oberlin & Fay
ATTORNEYS

Patented July 17, 1923.

1,462,319

UNITED STATES PATENT OFFICE.

JOHN P. BROPHY, OF CLEVELAND, OHIO.

SIGNAL DEVICE FOR VEHICLES.

Application filed July 20, 1921. Serial No. 486,045.

*To all whom it may concern:*

Be it known that I, JOHN P. BROPHY, a citizen of the United States, and a resident of Cleveland, county of Cuyahoga and State of Ohio, have invented a new and useful Improvement in Signal Devices for Vehicles, of which the following is a specification, the principle of the invention being herein explained and the best mode in which I have contemplated applying that principle, so as to distinguish it from other inventions.

The present signal device is of the general type consisting of a movable arm or semaphore mounted on the side of the vehicle so as to be capable of being extended outwardly therefrom in the place of the driver's hand, as is familiarly done when the driver desires to indicate a change in direction or that he is about to slow down or stop. The object of the invention is to provide a simple and inexpensive device of this character that may be readily affixed to the side of the car adjacent the driver's seat, and which may be operated by the simple pressure of the elbow without requiring either hand to be removed from the steering wheel or other control elements of the automobile.

To the accomplishment of the foregoing and related ends, said invention, then, consists of the means hereinafter fully described and particularly pointed out in the claim; the annexed drawing and the following description setting forth in detail certain mechanism embodying the invention, such disclosed means constituting, however, but one of various mechanical forms in which the principle of the invention may be used.

In said annexed drawing:—

Figure 1:
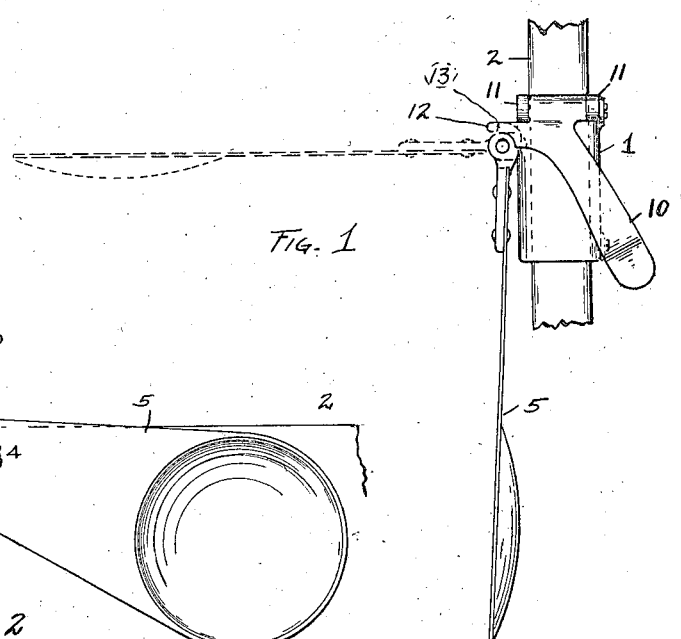
Figure 2:
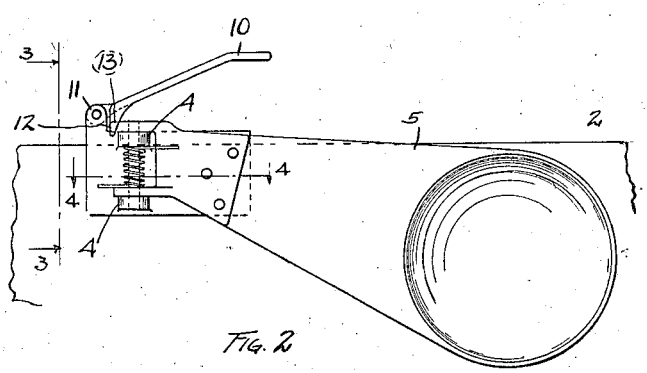
Figure 3:
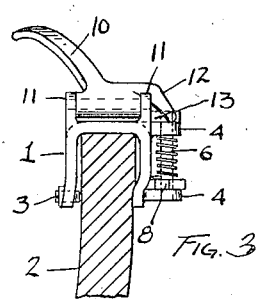
Figure 4:
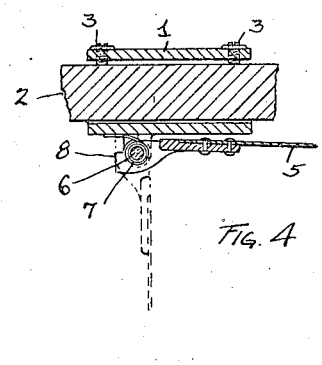

Fig. 1 is a plan view of my improved signal device shown as attached to the side of a car in the fashion referred to above; Fig. 2 is a side elevation of the same as viewed from the outside of the car; Fig. 3 is a front elevation of the device and a section of the portion of the car to which it is attached, the plane of the section being indicated by the line 3—3, Fig. 2; and Fig. 4 is a horizontal section of the device and corresponding portion of the car body taken on the plane indicated by the line 4—4, Fig. 2.

As illustrated in the several figures of the drawing the device is assumed to be attached on the left fore-door of the car body adjacent the driver's seat where the car is of the left-hand drive type. It will be obvious, however, that the device may be readily adapted for a reverse position, i. e., on the right-hand if for any reason this should be found desirable.

The base of the device consists of a U-shaped plate 1 that is adapted to fit over such door 2, or corresponding side panel of the car body if no door is provided at the point where the device is to be attached, such base being held in place by means of set screws 3 or equivalent fastening means. Projecting laterally from the outer face of the base are two vertically aligned lugs or ears 4, to which a signal arm or semaphore 5 is secured by means of a pin 6. Such arm is accordingly adapted to swing in a horizontal plane, being normally retained in a position parallel with the side of the car, as shown in full lines in Figs. 1, 2 and 4, for example, by means of a torsion spring 7, one end of which is prolonged and bears against the outer portion of the base 1, while the other end is similarly prolonged and bears against the arm itself. The inner end of the latter is formed with an abutment 8 which is adapted to engage with the corresponding ear 4 to limit the outward swinging movement of the arm to an approximately rectangular position with respect to the side of the car, as shown in dotted outlines in Figs. 1 and 4.

Such outward swinging movement of the arm is produced when desired through the medium of an actuating lever 10 that is pivoted about a transverse axis between two up-standing ears 11 on base 1, said lever being formed with a depending finger 12 that has a cam engagement with a lug 13 on the adjacent portion of the inner end of the signal arm.

The operation of the device will be readily apparent from the foregoing description; in other words, a simple pressure on the up-standing end of lever 10, such pressure being most conveniently applied by the driver's elbow, will suffice to throw the arm 5 out into its warning position. At the same time the simplicity of its construction will be evident. There are obviously no parts to get out of order, and by reason of the fewness, and simple construction of such parts, the device will be a relatively inexpensive one to manufacture, thus rendering it available for use on lower priced makes of automobiles.

Other modes of applying the principle of my invention may be employed instead of the one explained, change being made as regards the mechanism herein disclosed, provided the means stated by the following claim or the equivalent of such stated means be employed.

I therefore particularly point out and distinctly claim as my invention:—

In a device of the character described, the combination of an inverted U-shaped support adapted to be clamped onto the upper edge of the side of an automobile body or door, a signal arm pivotally attached to the outer side of said support for movement about an approximately vertical axis, a torsion spring associated with said arm adapted normally to retain the same in inactive position against the side of the automobile, a cam face on the inner end of said signal arm, a lever pivotally attached to the upper side of said support for movement about a transverse axis, and a depending cam finger upon said lever adapted to engage the cam face upon said signal arm to swing the same into active position when said lever is forced downwardly.

Signed by me, this 14th day of July, 1921.

JOHN P. BROPHY.